E. T. BURTON.
GOVERNOR REGULATOR.
APPLICATION FILED APR. 25, 1913.

1,179,895.

Patented Apr. 18, 1916.

Witnesses
Ernest Crooker

Inventor
E. T. Burton
By
Attorneys

UNITED STATES PATENT OFFICE.

ELBA T. BURTON, OF CARSON, IOWA.

GOVERNOR-REGULATOR.

1,179,895.

Specification of Letters Patent.   Patented Apr. 18, 1916.

Application filed April 25, 1913.   Serial No. 763,621.

*To all whom it may concern:*

Be it known that I, ELBA T. BURTON, a citizen of the United States of America, residing at Carson, in the county of Pottawattamie, State of Iowa, have invented certain new and useful Improvements in Governor-Regulators; and I do hereby declare the following to be a full, clear, and exact description of the invention, such as will enable others skilled in the art to which it appertains to make and use the same.

This invention relates to steam engines and has special reference to a regulating device to vary the speed of governor controlled engines.

The principal object of the invention is to improve the general construction of devices of this character.

A second object of the invention is to provide an improved means for regulating the position of a certain friction wheel used herewith.

With the above and other objects in view the invention consists in general of certain novel details of construction and combination of parts hereinafter fully described, illustrated in the accompanying drawings, and specifically claimed.

Figure 1:
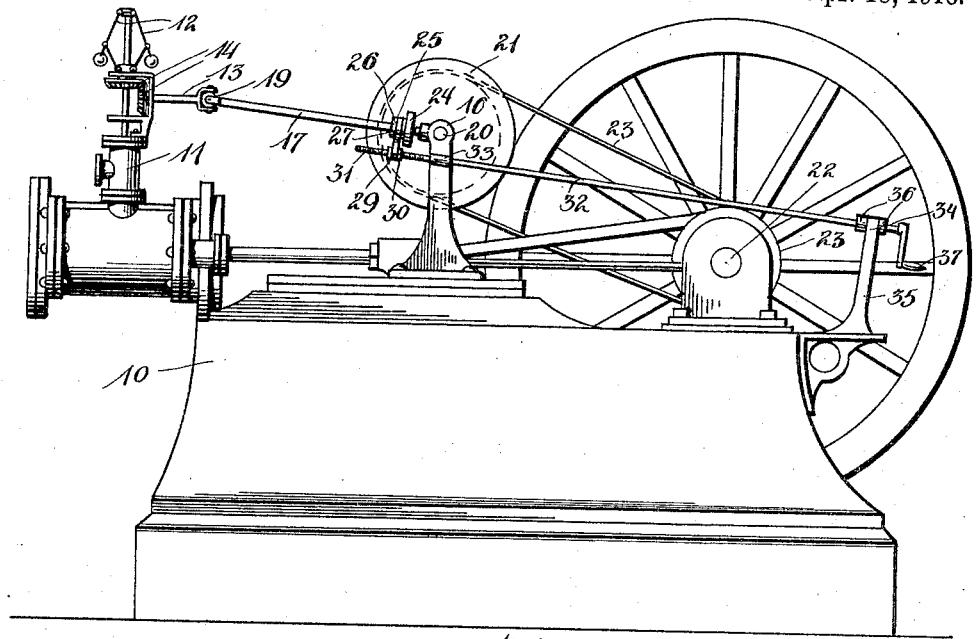
Figure 2:
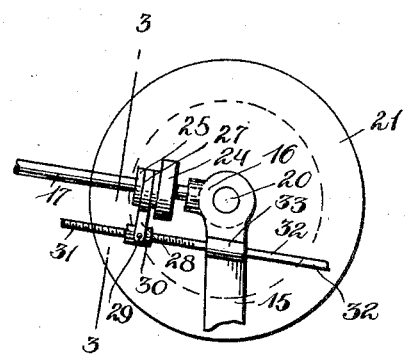
Figure 3:
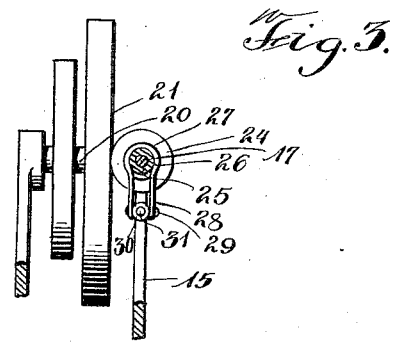
Figure 4:
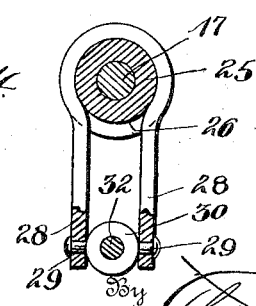

In the accompanying drawings, like characters of reference indicate like parts in the several views, and Figure 1 is a side elevation of an engine equipped in accordance with this invention. Fig. 2 is an enlarged side view of the friction wheel and adjacent parts. Fig. 3 is a section on the line 3—3 of Fig. 2. Fig. 4 is a detail showing a certain shipper ring used herewith.

In carrying out the objects of this invention an engine 10 of the usual type is equipped with a steam inlet valve fitting 11 provided with the usual governor 12 operated from the shaft 13 through the gears 14.

On the engine frame is mounted a standard 15 at the upper end of which is a bearing 16 which receives one end of a shaft 17 connected to the shaft 13 by a universal joint 19. Carried by the standard 15 is a stub shaft 20 whereon is a friction disk 21 operatively connected to the crank shaft 22 of the engine in any suitable manner, as by a belt 23. Splined upon the shaft 17 is a friction wheel 24 which bears against the disk 21 and this wheel is provided with a hub 25 having a groove 26 therein. In the groove 26 is mounted a shipper ring 27 the ends of which form ears 28 for the reception of pins 29 projecting from a nut 30. This nut 30 is carried by the screw threaded portion 31 of a rod 32 supported in a bearing 33 on the standard 15 and in a similar bearing 34 on a standard 35 adjacent the front of the engine frame. Collars 36 pinned to the rod on opposite sides of the bearing 34 prevent longitudinal movement of said rod while allowing it to rotate freely. In order to rotate the rod a suitable crank handle 37 is fixed thereon.

In operation the parts are so adjusted that the wheel 24 will be on the disk midway between the center and the rim. When it is desired to run the engine more slowly the crank handle is operated to move the wheel toward the periphery of the disk whereupon the shaft 17 and consequently the governor will rotate more rapidly and the governor will close the valve in the usual manner. Similarly higher speed can be obtained by moving the wheel 24 toward the center of the disk.

There has thus been provided a simple and efficient device of the kind described and of the character specified.

It will be obvious that many minor changes may be made in the form and construction of this invention without departing from the material principles thereof. It is not therefore desired to confine the invention to the exact form herein shown and described, but it is wished to include all such as come properly within the scope claimed.

Having thus described the invention, what is claimed as new, is:—

The combination with an engine, a crank shaft and governor, of a support mounted between the crank shaft and the governor, a shaft journaled at one end in said support and geared at its other end to the governor, a second shaft journaled in the support, a friction disk mounted on the second shaft, transmission means between the crank shaft and the second shaft, for rotating the latter and the friction disk, a friction wheel splined upon the first mentioned shaft and having a hub provided with a shipper groove, said friction wheel bearing against said friction disk, a shipper ring mounted in the said groove, an adjusting rod extending through the shipper ring, a support for the opposite end of said rod, a nut threaded on the adjusting rod and connected to the ring, and a handle for operating said rod.

In testimony whereof, I affix my signature, in the presence of two witnesses.

ELBA T. BURTON.

Witnesses:
C. D. SMITH,
C. A. FRASUR.

Copies of this patent may be obtained for five cents each, by addressing the "Commissioner of Patents Washington, D. C."